Dec. 20, 1960 W. C. SWARTOUT 2,965,772

SEMICONDUCTOR SWITCH

Filed Oct. 8, 1958

WITNESSES

Leon J. Lazar

James F. Young

INVENTOR

Willson C. Swartout

BY

George C. Thompson Jr.

ATTORNEY

United States Patent Office 2,965,772
Patented Dec. 20, 1960

2,965,772

SEMICONDUCTOR SWITCH

Willson C. Swartout, Lockport, N.Y., assignor to Westinghouse Electric Corporation, East Pittsburgh, Pa., a corporation of Pennsylvania Filed Oct. 8, 1958, Ser. No. 765,989

6 Claims. (Cl. 307—146)

This invention relates to a semiconductor switch and more particularly to a hypersensitive controllable diode capable of providing power loop control of a load circuit without the use of contact members in the load circuit.

The present invention provides for the use of a secondary control circuit for a load circuit capable of controlling the flow of current through the load circuit without the presence of make and break contacts in the load circuit. With this arrangement control contactors can provide unlimited operation without failure due to arcing or deterioration as a result of high currents.

It is therefore an object of this invention to provide a hyperconductive semiconductor control of a load circuit capable of providing long life.

It is another object of this invention to provide a load circuit control circuit provided with contact members for controlling the load circuit without carrying the current of the load circuit.

It is another object of this invention to provide a circuit controller that is operable among a multiple of positions with each movement being under substantially zero current conditions.

Other objects, purposes and characteristic features will become obvious as the description of the invention progresses.

In practicing this invention there is provided a load circuit having in series therewith a hyperconductive semiconductor capable of being controlled to provide two conditions, one of which is of extremely high resistance and the other of which is substantially zero resistance and high current flow. The semiconductor then is provided with a control circuit capable of directing the condition of the semiconductor to the desired operation.

In each of the several views, similar parts bear like reference characters.

Figure 1:
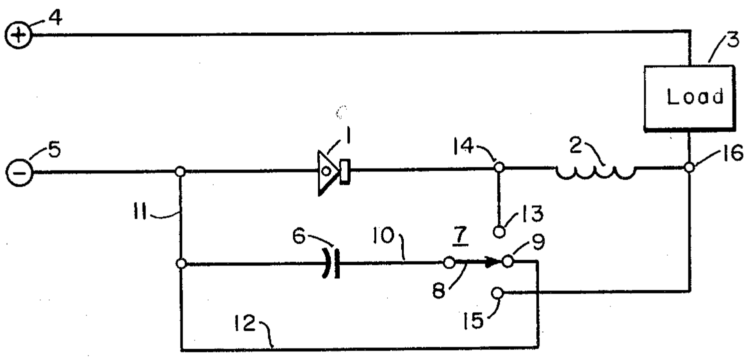
Figure 1 is a diagrammatic view of one embodiment of this invention.

The circuit of Fig. 1 comprises a load circuit provided with a hyperconductive semiconductor 1, an inductor 2 and a load 3 connected in series across a pair of suitable direct current source terminals 4 and 5 connected to a source of direct current, not shown. The hyperconductive diode 1 is of the type described in the copending application, Serial No. 642,743, entitled "Semiconductor Diode," filed February 27, 1957, invented by John Philips, and assigned to the common assignee. The semiconductor diode has the phenomena of being able to become highly conductive and therefore carry a substantial reverse flow of current at an extremely low voltage when a certain specified reverse voltage is exceeded.

If we assume that the terminal 4 is positive with respect to the terminal 5 and is of a voltage below the reverse breakdown voltage of the hyperconductive diode 1, it can be seen that no current will flow through the load 3. In order to provide a means of raising the direct current voltage to a value sufficient to break down the semiconductor diode 1, the inductor 2 charging a capacitor 6, connected through a three-positioned switch 7 to different points in the circuit, is provided. In the normal condition such as shown in Fig. 1, the switch is shown with its movable contact member or arm 8 connected in contact with its center fixed contact 9. The movable arm 8 is connected through the conductor 10 to one side of the capacitor 6. The capacitor 6 has its other terminal 11 connected to the negative source terminal 5 which is also connected to one side of the diode 1. The terminal 11 of the capacitor 6 is also connected through the conductor 12 to the fixed center point 9 of the switch 7. With the movable arm 8 of the switch 7 in contact with the center point 9, it can be seen that a shunt path for the capacitor 6 is provided. In this manner the capacitor 6 is assured of being completely discharged.

In addition to the fixed point 9, the switch 7 is provided with a fixed point 13 connected to a point 14 located between the other terminal of the semiconductor 1 and a terminal of the inductor 2. When the switch arm 8 is manually displaced to the contact 13 connected to the fixed point 14, it can be seen that the capacitor 6 is connected in parallel with the semiconductor 1.

In addition to the fixed contact points 9 and 13, the switch 7 is provided with a switch contact point 15 which is in turn connected to a point 16 located in the load circuit between the load 3 and the inductor 2. It can be seen therefore that when the movable switch arm 8 is moved into contact with the contact point 15, the capacitor is placed in shunt between the source terminal 5 and the point 16 and in parallel with the series connected semiconductor diode 1 and inductor 2.

Operation of the device will now be described. If we assume that the circuit is established as shown in Fig. 1, it can be seen that the capacitor 6 is completely discharged and the semiconductor 1 is preventing any current flow through the load 3. In order to switch the semiconductor to cause it to break down in a reverse direction, the movable arm 8 of the switch 7 is moved to the fixed contact point 13. When this occurs, the source immediately starts to charge the capacitor 6 up to a voltage level equal to the source. As the capacitor 6 reaches the source level voltage, current flow to the capacitor 6 stops which causes the inductor 2 field to collapse. As this field starts to collapse, the inductor 2 begins to act as an additional source of voltage for the capacitor 6. As a result, the capacitor 6 is provided with a transient or surge charge that is actually above the voltage supplied by the D.C. source from the terminals 4 and 5. As the capacitor 6 reaches or approaches its maximum charge, the reverse break down voltage of the semiconductor 1 is exceeded. When this occurs, the resistance of the semiconductor 1 drops to substantially zero allowing high current flow through the load circuit including the load 3. After semiconductor breakdown, the movable arm is moved to contact point 9 and with the contact point 9 connected to the movable arm, current will continue to flow through the load circuit. The movable arms of the switch may be spring biased to position 9 and manually held in the points 13 and 15 for the momentary time periods necessary.

Due to the fact that the semiconductor resistance during conduction is extremely low, the capacitor 6 became discharged to a substantially zero voltage condition during the time the movable arm 8 is in contact with the contact point 9. If the operator now desires to return the load circuit to a zero current flow condition, it is merely necessary to move the movable arm 8 from its center point 9 into contact with the contact point 15.

Since the capacitor 6 is previously discharged through point 9 contact and since there is almost no potential difference between points 8 and 13, no arc will be drawn when 8 opens from 13. The movement from point 9 to point 15 is made with zero current flowing in the movable contact arm 8 during closure of the switch 7, and thus the switch is interrupting a substantially zero current circuit. Completion of the movable contact arm 8 with the fixed contact point 15 establishes a momentary shunt circuit between the contact point 16 and the source terminal 5. This momentary shunt circuit occurs as a result of the charging current necessary to start the capacitor 6 on a recharging operation. The effective momentary shunt circuit between the contact point 16 and the source terminal 5 collapses the inductor 2 field and with the capacitor 6, still essentially a short circuit, the voltage applied to the semiconductor 1 drops to a level below the sustaining voltage necessary for the semiconductor diode 1. As a result, the diode 1 ceases to conduct and thus returns to its high resistance condition. When the capacitor 6 has reached its fully charged condition, the movable arm is again returned to the contact point 9 resulting in a complete discharge of the capacitor 6. It is pointed out again that with the capacitor fully charged prior to the movement of the arm 8 to the contact point 9, the interruption of the movable arm 8 to the fixed contact point 15 by the movement of the arm 8 to the contact point 9 interrupts a substantially zero current path.

The inductor 2 further serves as a buffer against line transients which might break down the hyperconductive negative resistance semiconductor diode.

Figure 2:
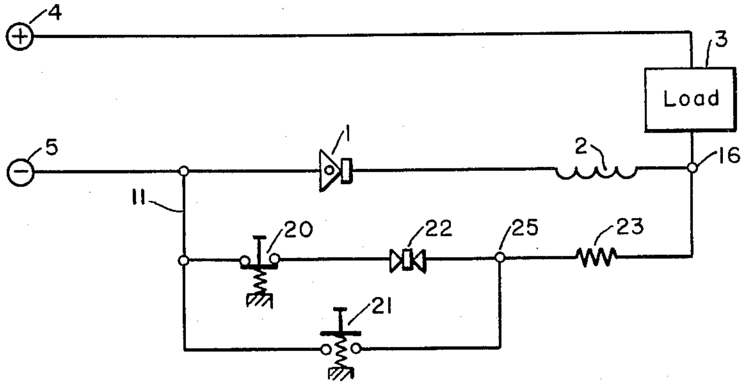
Fig. 2 is a diagrammatic view of another embodiment of this invention.

The embodiment shown by the circuit of Fig. 2 provides a load circuit similar to the load circuit of Fig. 1 in which the semiconductor diode 1, inductor 2 and load 3 are connected across a suitable set of source terminals 4 and 5. In order to provide semiconductor diode switching, however, this embodiment uses a pair of switches 20 and 21, a varistor 22 and a suitable resistance 23. The control circuit in this embodiment comprises the normally closed switch 20, the varistor 22 and the resistance 23 connected in series between the points 11 and 16 in the load circuit previously described. The point 11 is located between the semiconductor 1 and the source terminal 5. The point 16 is located between the inductor 2 and the load 3 such as described in connection with Fig. 1. The normally open switch 21 is connected between the point 11 and the point 25 which is located between the varistor 22 and the resistance 23 in the control circuit.

Operation of the embodiment of Fig. 2 will now be described. If we assume the conditions of the circuit as shown in Fig. 2 exist with the normally closed contact 20 in its closed position, a parallel path to the portion of the path located between the point 16 and the point 11 in the load circuit is provided. This parallel path is of sufficiently low resistance to provide a current through the resistance 23 and varistor 22 to cause a drop in the voltage being applied to the semiconductor 1 to some level below the breakdown voltage necessary for the semiconductor 1. Under these conditions the load circuit is basically inactive with only a small current flow through the load 3 dictated by the resistance 23 and varistor 22. In this case it is necessary to have the source voltage between the terminals 4 and 5 equal to approximately reverse breakdown voltage necessary for the semiconductor diode 1.

If high load current is desired through the load 3, it is only necessary to depress the normally closed switch 20 interrupting the varistor and resistor 23 circuit causing the voltage applied to the semiconductor diode 1 to rise to the full source voltage on the terminals 4 and 5. When this occurs, reverse breakdown of the semiconductor diode 1 occurs reducing the diode resistance to substantially zero and allowing load current to flow through the inductor 2 and semiconductor diode 1 as well as the load 3. Even though the switch 20 when released is returned to its closed position again completing the parallel control circuit including the varistor 22 and resistance 23, the control circuit does not again assume control of the semiconductor diode, since, under conditions of low current flow, the varistor 22 assumes a high resistance condition. With this condition existing the parallel circuit cannot drop the voltage applied across the semiconductor diode and inductor 2 to a level below the sustaining voltage level of the semiconductor diode 1. When the operator desires to return the semiconductor diode 1 to its inoperative or high resistance condition, it is only necessary to depress the contactor 21 placing a shunt between the points 11 and 25 in the control circuit causing a high current path to occur between the points 16 and 11 in the load circuit. Since the parallel path formed by the resistor 23 and the now momentarily closed contactor 21 is in parallel with semiconductor diode 1 and inductor 2, the voltage across the semiconductor diode 1 falls below the sustaining voltage level and the diode again returns to a high resistance condition. Since the resistance of the diode 1 is again greater than the resistance of the varistor 22, release of the contactor 21 interrupting the shunt path between the points 24 and 25 will cause current to again flow through the varistor 22 and closed contact member 20. The circuit is therefore again returned to its normal state.

The inductor 2 in this circuit is primarily used to hold back or absorb voltage transients occurring in the direct current supply source connected to the voltage terminals 4 and 5. This prevents voltage surges from being applied to the semiconductor diode 1 and thus prevents the circuit from being unstable during voltage transients. This particular circuit is more subject to voltage transient conditions in view of the fact that the voltage between 16 and 25 must be fairly close to, although below, the actual reverse voltage needed to break down the semiconductor diode 1.

Figure 3:
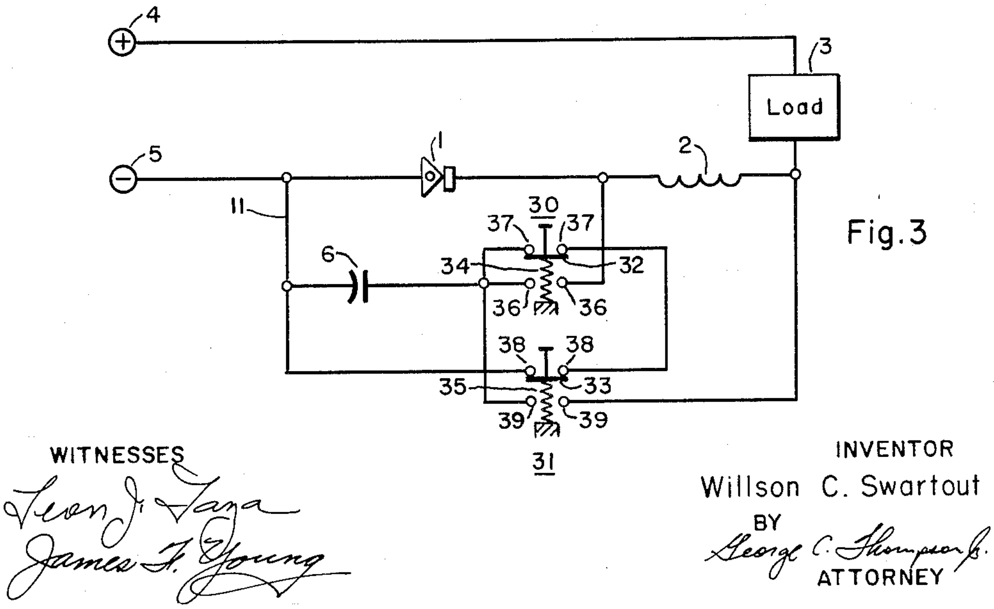
Fig. 3 is a diagrammatic view of still another embodiment of this invention.

The embodiment of Fig. 3 is similar to Fig. 1 with the exception that a pair of switches 30 and 31 are used in place of the single multiple position switch 7 of Fig. 1. The switches 30 and 31 have movable members 32 and 33 respectively biased to the positions shown by suitable springs 34 and 35 respectively.

To activate the load circuit, the operator depresses the switch member 32 contacting the fixed contacts 36. The capacitor 6 becomes charged in the manner described in connection with Fig. 1 and the semiconductor 1 breaks down and conducts load current. Release of the member 32 completes a discharge path for the capacitor 6 through the fixed contacts 37 and leaves the load circuit unaffected. To interrupt the load circuit the switch member 33 is depressed interrupting the capacitor 6 discharge circuit at the contacts 38 and contact is made with the fixed contacts 39. Closure of the contacts 39 places the capacitors in parallel with the semiconductor and inductor causing the semiconductor to return to non-conducting state in the manner described in connection with Fig. 1.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A switching system comprising a load circuit and a control circuit, a hypersensitive semiconductor diode in said load circuit, control means in said control circuit, said control means when in one condition being connected to said semiconductor diode to selectively cause said diode to conduct in its reverse direction, said control means when in another condition being connected to cause said semiconductor diode to cease conduction, said control means comprising a control contactor, a series connected capacitor, and circuitry for selectively connecting said capacitor either in parallel to the diode to charge the capacitor or upon itself to discharge the capacitor.

2. A switching system comprising a load circuit and a control circuit, a hypersensitive semiconductor diode in said load circuit, control means in said control circuit, said control means when in one condition being connected to said semiconductor diode to selectively cause said diode to conduct in its reverse direction, said control means when in another condition being connected to cause said semiconductor diode to cease conduction, said control means comprising a control contactor and a series connected capacitor, and an inductor in series with said diode in said load circuit, said contactor having three positions, one for connecting the capacitor in parallel with the diode, one for connecting the capacitor upon itself, and one for connecting the capacitor in parallel to the inductor and capacitor.

3. A switching system comprising a load circuit and a control circuit, a hypersensitive semiconductor diode in said load circuit, control means in said control circuit, said control means when in one condition being connected to said semiconductor diode to selectively cause said diode to conduct in its reverse direction, said control means when in another condition being connected to cause said semiconductor diode to cease conduction, said control means comprising a control contactor and a series connected capacitor, an inductor in series with said diode in said load circuit, said contactor having three positions, a first position of said contactor for connecting said capacitor in parallel with said semiconductor diode, a second position of said contactor for connecting a shunt path across said capacitor and a third position of said contactor for connecting said capacitor in parallel with said semiconductor diode and said inductor.

4. A switching system comprising a load circuit and a control circuit, a hypersensitive semiconductor diode in said load circuit, control means in said control circuit, said control means when in one condition being connected to said semiconductor diode to selectively cause said diode to conduct in its reverse direction, said control means when in another condition being connected to cause said semiconductor diode to cease conduction, said control means comprising a pair of contactors and a varistor, one of said pair of contactors and said varistor being connected in series with said one contactor being normally closed, said one contactor and said varistor being connected in parallel with said semiconductor diode.

5. A switching system comprising a load circuit and a control circuit, a hypersensitive semiconductor diode in said load circuit, control means in said control circuit, said control means when in one condition being connected to said semiconductor diode to selectively cause said diode to conduct in its reverse direction, said control means when in another condition being connected to cause said semiconductor diode to cease conduction, said control means comprising a pair of contactors and a varistor, one of said pair of contactors and said varistor being connected in series with said one contactor being normally closed, said one contactor and said varistor being connected in parallel with said semiconductor diode, the other of said pair of contactors being normally open and connected in parallel with said series connected said one contactor and varistor.

6. A switching system comprising a load circuit and a control circuit, a hypersensitive semiconductor diode in said load circuit, control means in said control circuit, said control means when in one condition being connected to said semiconductor diode to selectively cause said diode to conduct in its reverse direction, said control means when in another condition being connected to cause said semiconductor diode to cease conduction, said control means comprising a pair of contactors and a varistor, one of said pair of contactors and said varistor being connected in series with said one contactor being normally closed, said one contactor and said varistor being connected in parallel with said semiconductor diode, the other of said pair of contactors being normally open and connected in parallel with said series connected said one contactor and varistor, and current limiting resistor means in said control circuit.

No references cited.